United States Patent
Bi et al.

(10) Patent No.: US 6,311,178 B1
(45) Date of Patent: Oct. 30, 2001

(54) MULTI-ELEMENT CONFIDENCE MATCHING SYSTEM AND THE METHOD THEREFOR

(75) Inventors: Fujun Bi, Beijing (CN); Ran Li, Danville, CA (US); Shaun Bliss, Alameda, CA (US); Reza Nojoomi; Hong Yan, both of San Ramon, CA (US)

(73) Assignee: Webplus, Ltd., Hong Kong (HK)

( * ) Notice: Subject to any disclaimer, the term of this patent is extended or adjusted under 35 U.S.C. 154(b) by 0 days.

(21) Appl. No.: 09/155,473

(22) PCT Filed: Sep. 29, 1997

(86) PCT No.: PCT/CN97/00096

§ 371 Date: Sep. 9, 1998

§ 102(e) Date: Sep. 9, 1998

(87) PCT Pub. No.: WO99/17224

PCT Pub. Date: Apr. 8, 1999

(51) Int. Cl.⁷ .............................. G06F 17/30; G06F 17/60
(52) U.S. Cl. .................................. 707/3; 705/37
(58) Field of Search .................. 707/1, 2, 3, 4–5, 707/6, 7; 705/26–27, 35–37

(56) References Cited

U.S. PATENT DOCUMENTS

| | | | |
|---|---|---|---|
| 5,077,665 | * | 12/1991 | Silverman et al. ...... 705/37 |
| 5,544,049 | * | 8/1996 | Henderson et al. ...... 364/419.19 |
| 5,742,816 | * | 4/1998 | Barr et al. ...... 707/104 |
| 5,835,896 | * | 11/1998 | Fisher et al. ...... 705/37 |
| 5,845,278 | * | 12/1998 | Kirsch et al. ...... 707/3 |
| 5,870,740 | * | 2/1999 | Rose et al. ...... 707/5 |
| 5,905,974 | * | 5/1999 | Fraser et al. ...... 705/37 |
| 5,915,250 | * | 6/1999 | Jain et al. ...... 707/100 |
| 5,933,822 | * | 8/1999 | Braden-Harder et al. ...... 707/5 |
| 5,963,951 | * | 10/1999 | Collins ...... 707/102 |
| 5,983,220 | * | 11/1999 | Schmitt ...... 707/5 |
| 5,991,758 | * | 11/1999 | Ellard ...... 707/6 |
| 6,006,222 | * | 12/1999 | Culliss ...... 707/5 |
| 6,012,053 | * | 1/2000 | Pant et al. ...... 707/3 |
| 6,018,733 | * | 1/2000 | Kirsch et al. ...... 707/3 |
| 6,058,379 | * | 5/2000 | Odom et al. ...... 705/37 |
| 6,078,914 | * | 6/2000 | Redfern ...... 707/3 |
| 6,101,491 | * | 8/2000 | Woods ...... 707/3 |

* cited by examiner

*Primary Examiner*—Thomas Black
*Assistant Examiner*—Mary Wang
(74) *Attorney, Agent, or Firm*—Flehr Hohbach Test Albritton & Herbert LLP

(57) ABSTRACT

The present invention relates to a computer matching system used by a plurality of users and the method therefor, said system comprising a database; an offer creation program means for creating an entity for an offer input by each user in the database and storing said offer therein; and a search engine for comparing and matching a requirement input by a user with other users' offers stored in the database and returning matching results to said user. Advantageously, said requirement includes multiple elements as search criteria, each of said elements is assigned a weight of importance thereby each matching result has a search score indicating satisfaction level of said user, said search engine further perform ordering and ranking of said matching results according to the respective search scores thereof, and only the matching results have search scores above a predetermined satisfaction level are returned to said user. Said multi-element confidence matching system can automatically provide the user or trader with the information he is interested in without the intervention of the trader, and give the user the maximum amount of information about offers which may meet their requirement, so as to give the trader the ability to not just see offers which exactly match their criteria, but ones which come close or can fulfill part of, or more than, their needs, thereby the trader may conduct the search efficiently

22 Claims, 19 Drawing Sheets

| Condition | | | Relation | weight | Inclusive |
|---|---|---|---|---|---|
| ( | Color | = | White | | OR | | |
| | Color | = | Blue | ) | AND | 80 | |
| | Price | < | 100 | | | 20 | Y |
| | | | | | | | |

FIG. 15

MULTI-ELEMENT CONFIDENCE MATCHING SYSTEM AND THE METHOD THEREFOR

FIELD OF THE INVENTION

The present invention relates to a computer matching system and the method therefor, or specifically, relates to electronic trading system which is a multi-element confidence matching system built on a database for matching a user's requirement with the offers provided by the other users, and returns the matching results to the user.

BACKGROUND OF THE INVENTION

What the traders are currently dealing with is the world trade market, and traders need to trade with traders in other countries efficiently and reliably, therefore electronic trading systems are used wider and wider in the international trade practice in recent years.

So far, there are many electronic trading systems used in international trade, such as EDI(Electronic Data Interchange), but EDI is used to help traders to send or receive offer to/from designated traders, it can not be used to help traders to find offers which they are interested There are trading systems which help traders to find the goods they need from the other traders, or help them to find buyers for their goods, and help them cope with a lot of business related affairs The task of the trading systems is to match trader's requirements with offers that have been posted by other traders via the electronic trading system. This is normally achieved by doing a direct search of user criteria with the offers available and displaying just the plain results of the search in generic order Attempt to find the best result in response to criteria specified by users is a very old subject in the information technology So many different methods of query and matching systems have been implemented and is improving every day. Most of the systems are using the industry standard tools for their purpose and their flexibility extends to what those tools can do for them Standard search engines mainly examine the search criteria and the result they produce is a set of zero, one or many cases that match exactly all the conditions of criteria. No matter how many conditions a case has satisfied, if fails in one that case will not be a part of result set, even if the condition is the least important among others Specially with ranges, mainly users might want to have choices that are not exactly complying with what they want but close to that In other words database engines like Informix, Oracle, Sybase, Ingres and others have only two choices for matching cases, "Match" and "No Match".

With the conventional trading system, when a user gives a search criteria, normally an overwhelming amount of information is returned, the user must find out what he is interested in, and if necessary, he may add some more conditions in the criteria, or input a further search criteria or formula, so as to conduct another search to reduce the amount of the information returned. Apparently, he must narrow the results by himself, until he finds a satisfying result He must search from one category to another category, and he must read the information displayed on the screen carefully each time before he selects a new search criteria, and without the user's intervention during the search process, the search can not be conducted successively. On one hand, if the search criteria contains too few conditions, the returned information may be too much, most of which may not be the information he is interested in. On the other hand, if the search criteria contains too many conditions, the user may miss the information which is most important to him, because of failure to satisfy a not so important condition, as described above.

Therefore, the conventional search system is not convenient for the user to use, and can not conduct search efficiently. When a user uses such a system, time and cost consumed in the search process is increased.

SUMMARY OF THE INVENTION

It is an object of the present invention to provide a multi-element confidence matching system, which can automatically provide the user or trader with the information he is interested in without the intervention of the trader, and give the user the maximum amount of information about offers which may meet their requirement, so as to give the trader the ability to not just see offers which exactly match their criteria, but ones which come close or can fulfill part of, or more than, their needs, thereby the trader may conduct the search efficiently.

Advantageously, the present invention adds a level of sophistication to standard tools, and implements user's thoughts in accepting or rejecting cases It means by involving more parameters of user's choices, the system will be able to tolerate the result and based on user's preference accept those cases that comply with the most important conditions and only fail to satisfy minor conditions.

To achieve the above objects and advantages, the present invention provides a computer matching system used by a plurality of users and the method therefor, said system comprising a database; an offer creation program means for creating an entity for an offer input by each user in the database and storing said offer therein; and a search engine for comparing and matching a requirement input by a user with other users' offers stored in the database and returning matching results to said user It is preferred that in the computer matching system of the present invention, said requirement includes multiple elements as search criteria, each of said elements is assigned a weight of importance thereby each matching result has a search score indicating satisfaction level of said user, said search engine further perform ordering and ranking of said matching results according to the respective search scores thereof, and only the matching results have search scores above a predetermined satisfaction level are returned to said user.

It is also preferred that said user interface to said matching system is via the internet.

The foregoing and other objects, features and advantages of the present invention will become more readily apparent from the following detailed description of preferred embodiments of the invention which proceeds with reference to the accompanying drawings.

BRIEF DESCRIPTION OF THE DRAWINGS

FIG. 15 shows a sample of interface which is provided for user to specify his criteria of search of this example.

DETAILED DESCRIPTION OF PREFERRED EMBODIMENTS

Reference will now be made in detail to the preferred embodiments of the present invention, examples of which are illustrated in the accompanying drawings.

Figure 1:
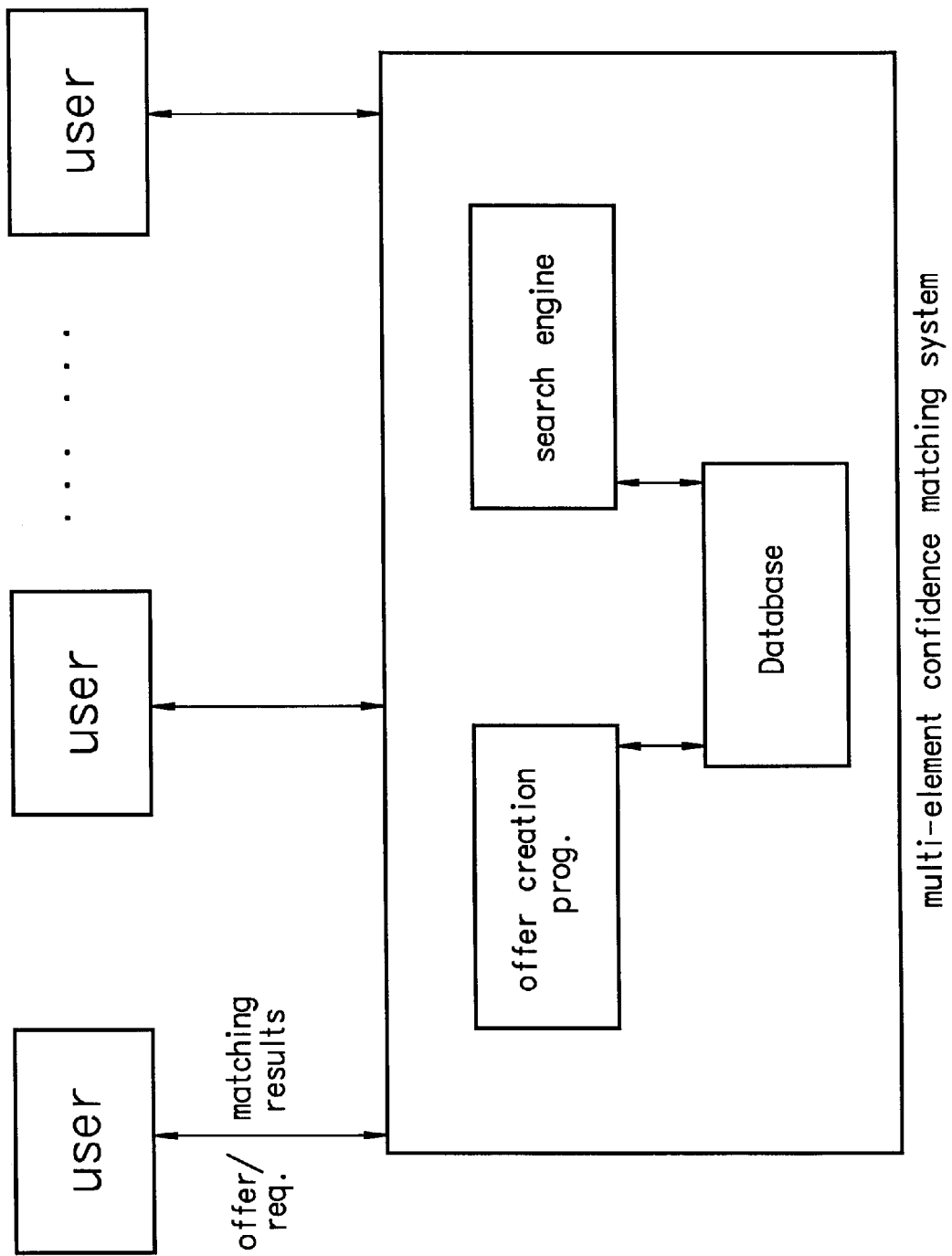
FIG. 1 shows the basic structure of the multi-element confidence matching system of the present invention.

FIG. 1 shows the basic structure of the multi-element confidence matching system of the present invention, As shown in FIG. 1, the multi-element confidence matching system is used by a plurality of users, and comprises a database, an offer creation program for creating an offer entity in the database, and a search engine for comparing search criteria or requirement input by a user with the offers existing in the database. When an offer is input by a user, the offer is processed by the offer creation program and stored in an offer entity in the database When a requirement is received from a user, the search engine is executed to match the requirement with the existing offers, stored in the offer entities in the database of all the other users. The matching results may be ranked according to a confidence, i.e., a matching level or search score, and the matching results are returned to the corresponding user.

The users are able to interface to the multi-element confidence matching system via the internet, And the database can include a requirement entity, which can be a virtual one.

Figure 2A:
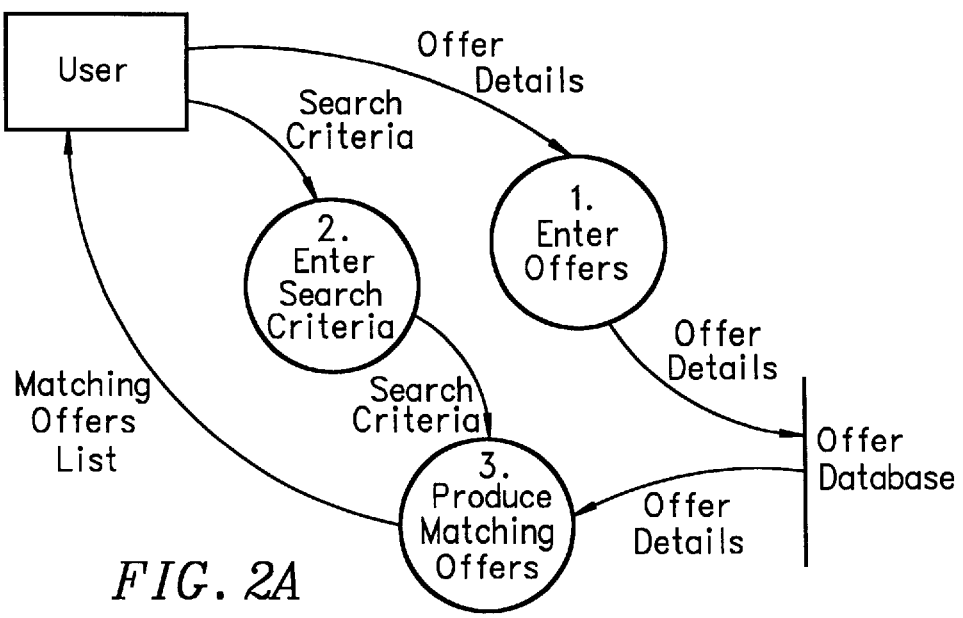
FIG. 2a and 2b illustrate the main data flow diagram of the present invention.
Figure 2B:
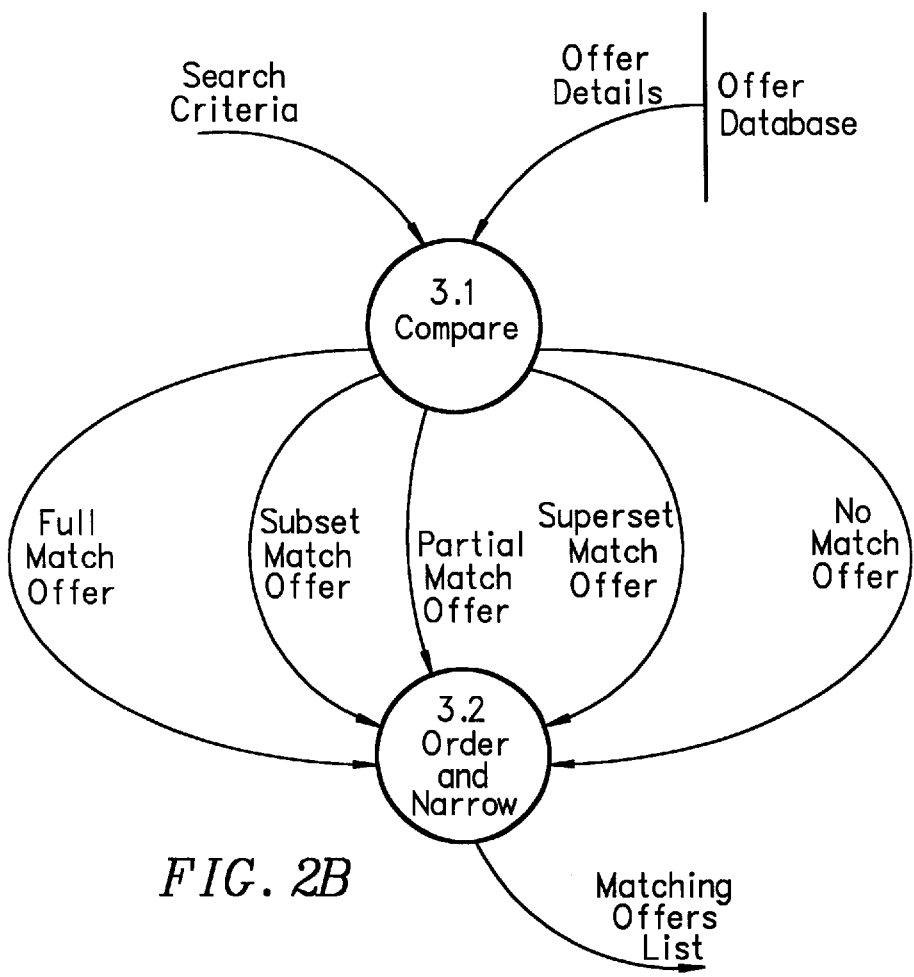

FIG. 2a and 2b illustrate the principle of the diagram of the method implemented in the multi-element confidence system of the present invention. As shown in FIG. 2a, the offer details entered by each user are written to the offer database, and the search criteria, i.e., the requirement entered by the user, is sent to the matching procedure generated by executing the matching program or search engine in FIG. 1, the matching procedure compares the requirement with the offer details, from all the other users, which are stored in the offer database, and thereby the matching offers list is returned to the user.

The matching process performed in the matching procedure is illustrated in detail in FIG. 2b. As shown in FIG. 2b, first, the search criteria, i.e., the requirement entered by the user, which contains multiple conditions or elements, is compared with the offers from the offer database Each of the conditions is assigned a weight indicating the importance thereof, thereby each matching result has a search level indicating satisfaction of the user. The results of the comparison have six levels, such as full match offer, subset match offer, partial match offer, superset match offer and no match offer. The results of the comparison are ordered and narrowed, and the matching results which have level greater than a minimum acceptable level(MAL) designated by the user are returned to the user. The above process is automatically performed by the multi-element confidence matching system once the requirement is input by the user, and the matching results are returned to the user, thereby the user can get the offers which satisfy his requirement instantly, and more advantageously, the matching results are not only the exact match which %100 satisfies the user's criteria, but also includes the results of partial match or inclusive match In trading field, an offer may be buy(demand) or sell (supply), and a requirement may be buy or sell, too. Therefore, if a requirement is a demand, it is compared with the supply offers in the database; if the requirement is a supply, it is compared with the demand offers in the database.

Figure 3:
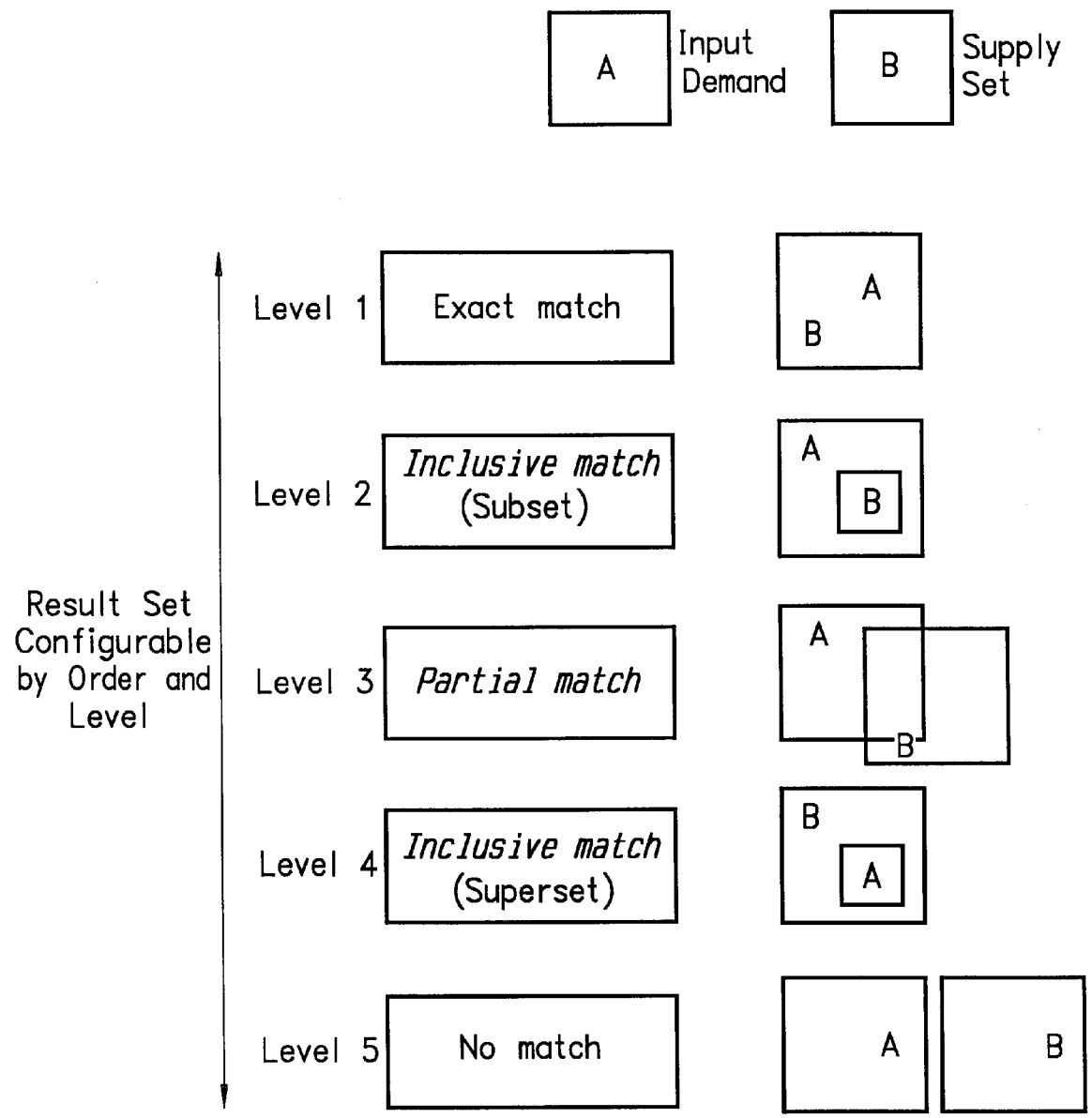
FIG. 3 illustrates the matching levels result from the search in the system according to the present invention

FIG. 3 illustrates the matching levels result from the search in the system according to the embodiment of the present invention, As shown in FIG. 3, the matching results are ordered and ranked according to the levels thereof, and the matching result set are configurable by order and level, wherein level 1 is exact match, i.e., full match, which means the input demand A is exactly the same as the supply set; level 2 is inclusive match, in which the supply set B is a subset of the input demand A, i.e., set B only covers part of the set A; level 3 is partial match, in which the set A and set B have an area overlapped to each other; level 4 is also an inclusive match, but the supply set B is superset of the input demand A; and level 5 is no match, in which there is no common part between the set A and set B.

Each search criteria or requirement may include multi-elements such as product, market position(buyer or seller, or both), date of offer, date of delivery, offerer, price and volume The offer might contain the same elements as that of the requirement so as to be compared with the requirement. Each of the elements of the requirement is compared with that of the offers in the database, and each sequence of the process of matching the respective elements may be given a weight by the user. The above six levels of matches each has a score resulted from the weights assigned by the user, and from level 1, the FULL MATCH, to level 6, the NO MATCH, the score is decreased from 100% to 0.

Figure 4A:
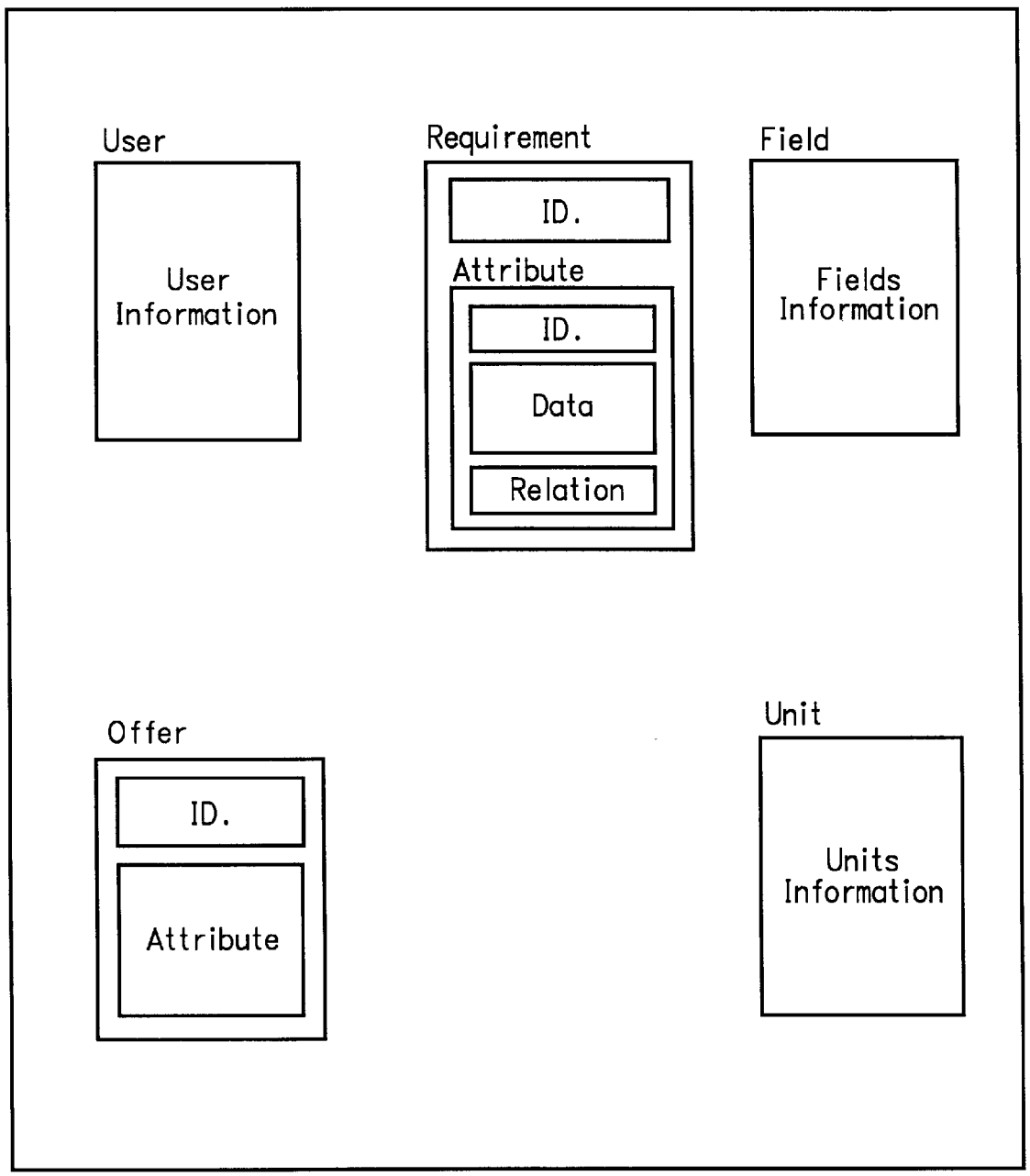
FIG. 4a illustrates the configuration of the data entities in the database of the invention.

FIG. 4a illustrates the configuration of the data entities in the database of the invention In the database, there is a user entity, which is a member of the system, and creates and owns requirements and offers. The user information stored in the user entity is mainly flat, raw user data, and it will be obtained by an interface available to the user. The requirement is a virtual entity, and is also referred to as search criteria, as described above In traditional activities, the criteria information entered by the user is not kept in the database, but if this information is intended to be for afterward notification and triggering system, the criteria could be stored in a real entity. As shown in FIG. 4a, the requirement entity includes an ID, and an attribute, which includes a requirement ID, data, and a relation. The requirement-Attrib is used for keeping information about individual parts of the requirement During the process of creating a requirement, the system may create new entries for this entity called complex attributes, which consist of the result of previous single attribute The offer entity stores user's offers for supply or demand, and this entity keeps ID and fixed part of the offers, which is the information like description of product or any other piece that will not participate in criteria and search process, and the offer Attribute keeps the variable part of offers, showing the attributes of offer. Here variable parts are those participate in attributes and criteria, like price, color, material and etc.

In addition, the database also includes a field for storing field information and a unit entity for unit information The definition to the above entities is shown in Table I below.

TABLE 1

| Entity Name | Description |
| --- | --- |
| USER | A member of system, creates and owns requirements and offers. User information is mainly flat, raw data about user. It will be obtained by an interface available to user. |
| REQUIREMENT (Virtual Entity) | is also referred as search criteria. In traditional search activities, criteria information entered by user is not kept in database, but if this information is intended to be base for afterward notification and triggering system, could be stored in a real entity. |
| REQUIREMENT ATTRIBUTE (Virtual Entity) | keeps information about individual parts of requirement. During the process of requirement system might create new entries for this entity called complex attribute, which consists of result of previous single attribute. |
| OFFER | All users offer for supply or demand. This entity keeps the Id. And fixed part of the offers. |
| OFFER_ATTRIB | variable part of offers, showing the attributes of offer. |
| FIELD | look-up table for name of fields will be used in offer and requirement entities to refer to type of specifications. |
| UNIT | look-up table to be used to show the units for figures in offer and requirement entities. |

Although Requirement and Offer entities contain similar information, their functionality is different. Offer entity keeps information about fixed demand or supply, user provides or requests. This information will be tested by the system every time a requirement (search criteria) is submitted. Requirement contains user specified conditions and include ranges. Requirement is a virtual entity, means that it will not necessarily be kept in a real entity after the process is finished.

Field and Unit entities are tables used to create attributes for Offer and Requirement.

Figure 4B:
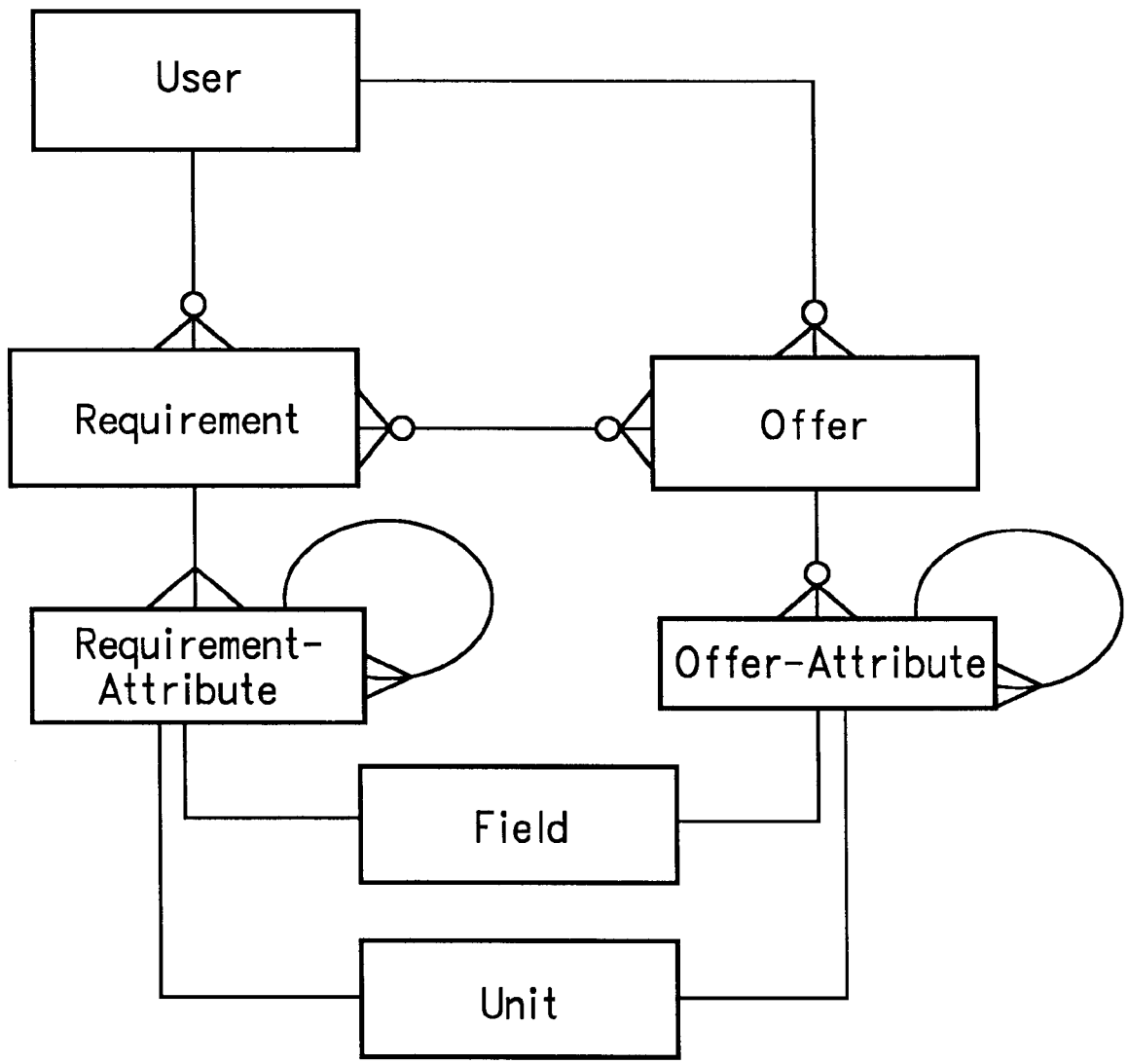
FIG. 4b illustrates the relationship among the entities in the database according to the invention.
Figure 4C:
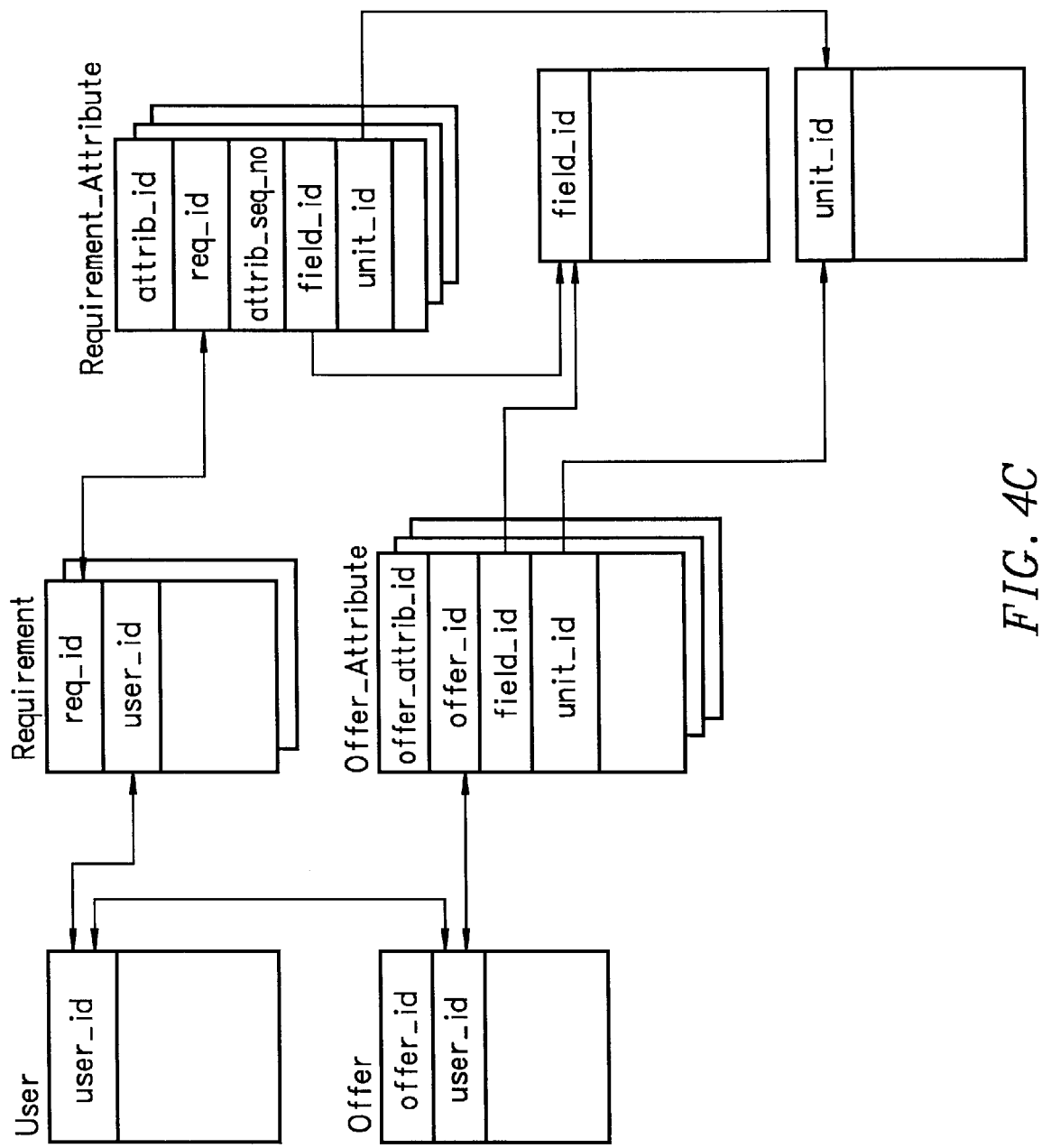
FIG. 4c illustrates the details of the key relationship shown in FIG. 4b.

FIG. 4b illustrates the relationship among the entities in the database according to the embodiment of the present invention. As shown in FIG. 4b, each user has a record in user entity, and there is no more than one entry for each user. There is zero, one or more than one requirement for each user, and these requirements are tied to user's entry Each user may create zero, one or more than one demand or supply offer. Each offer/ requirement has one or more attribute. Every attribute will point to an entry in field entity to show the type of field. And every attribute will point to the entry in the unit entity to specify the unit type FIG. 4c illustrates the details of the key relationship of the entities shown in FIG. 4b, and the detailed description to the corresponding attributes for separate entities is shown in following tables 2–8.

TABLE 2 entity name: user

| Attribute Name | Attribute Definition | NOT NULL Primary Key |
| --- | --- | --- |
| user-id | Identification number, unique for each user | |
| user_identity | Series of information about a user's identification. Attributes and their types could vary based on sector, subject and nature of the business, but this information is mostly of the fixed, informative type and does not affect the flow of the logic. | |
| user_profile | information about a user's preferences. This will be used in order to specify the look and type of information represented to the user in general an during execution of individual tasks. | |

TABLE 3

Entity Name: Requirement(Virtual Entity)

| Attribute Name | Attribute Definition | Null option |
| --- | --- | --- |
| req_id | Identification number for request | NOT NULL Primary key |
| user_id | Includes user-id of the user creating the requirement | NOT NULL |
| demand_supply | A flag to show whether the requirement is a demand or supply | |

TABLE 4

Entity Name: Requirement_attribute

| Attribute Name | Attribute Definition | Null Option |
| --- | --- | --- |
| attrib_id | Identification number for attribute. | NOT NULL Primary Key |
| req_id | Shows to which request this attribute belongs. | NOT NULL Primary Key |
| attrib_seq_number | Shows the order of the attribute to be evaluated. | NOT NULL Primary Key |
| field_id | Identification number for field within this entity to point to field in the offer entity. | NOT NULL |
| exact | If on, means the comparison should match exactly | |
| pattern | For text fields, If on, means match anywhere within the field | |

TABLE 4-continued

Entity Name: Requirement_attribute

| Attribute Name | Attribute Definition | Null Option |
|---|---|---|
| before_less | If on, for numeric values means smaller and for dates means before | |
| after_great er | If on, for numeric values means greater and for dates means after | |
| range | If on, means within a range | |
| unit_id | The unit type belonging to the input fields. (e.g. kg, ton, . . . ) | |
| input_field 1 | The text field 1 participates in comparison, based on type of field might be converted to one of Date or Numeric types. If contains attribute_id means that this is a complex attribute and consists of other attribs. | |
| input_field 2 | The text field 2 participates in comparison within a range, based on type of field might be converted to one of Date or Numeric types. | |
| weight | Shows the value user gives to this attribute to be effective in level of satisfaction for the search. | NOT NULL |
| inclusive | If attribute is a range this will be true. | |
| relation_ty pe | Shows the relationship between attribs, if it's a complex attribute. | |

TABLE 5

Entity Name: offer

| Attribute Name | Attribute Definition | Null Option |
|---|---|---|
| offer_id | Identification number for offer. | NOT NULL Primary Key |
| user_id | User identifier, who owns the offer | NOT NULL Primary Key |
| demand_supply | Shows the offer is a demand offer or is a supply | NOT NULL |

TABLE 6

Entity Name: offer_attribute

| Attribute Name | Attribute Definition | Null Option |
|---|---|---|
| offer_attrib_id | Identification number for offer attribute. | NOT NULL Primary Key |
| offer_id | Points to the offer that this attribute belongs to | NOT NULL Primary Key |
| field_id | Identifier for the field within the offer | NOT NULL Primary Key |
| field_unit_id | Shows measurement unit of the field | |
| field_custom_name | The name user gives to this field | |
| field_content | Contains value in text, if the type is other than text, will be converted later in process | NOT NULL |

TABLE 7

Entity Name: field

| Attribute Name | Attribute Definition | Null Option |
|---|---|---|
| field_id | Identification number for field. | NOT NULL Primary Key |
| field_name | Name of the field (e.g. Price, Moisture, Color) | NOT NULL |
| field_type | Shows whether the field is of the type Text, Numeric or Date | NOT NULL |
| field_length | Shows the length of the field | NOT NULL |

TABLE 8

Entity Name: unit

| Attribute Name | Attribute Definition | Null Option |
|---|---|---|
| unit_id | Identification number for unit. | NOT NULL Primary Key |
| unit_name | Name of the unit (e.g. Kilogram, Ton, Mile, Centimeter) | NOT NULL |

Figure 5:
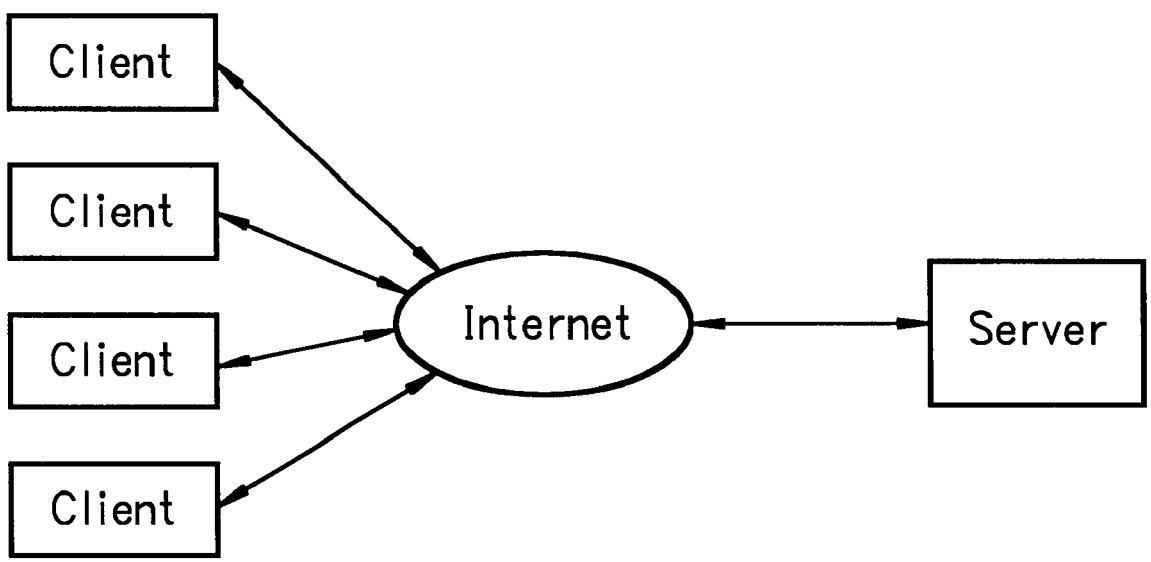
FIG. 5 illustrates a web-based clients communicating over the internet to an information server according to an embodiment of the invention.
Figure 6:
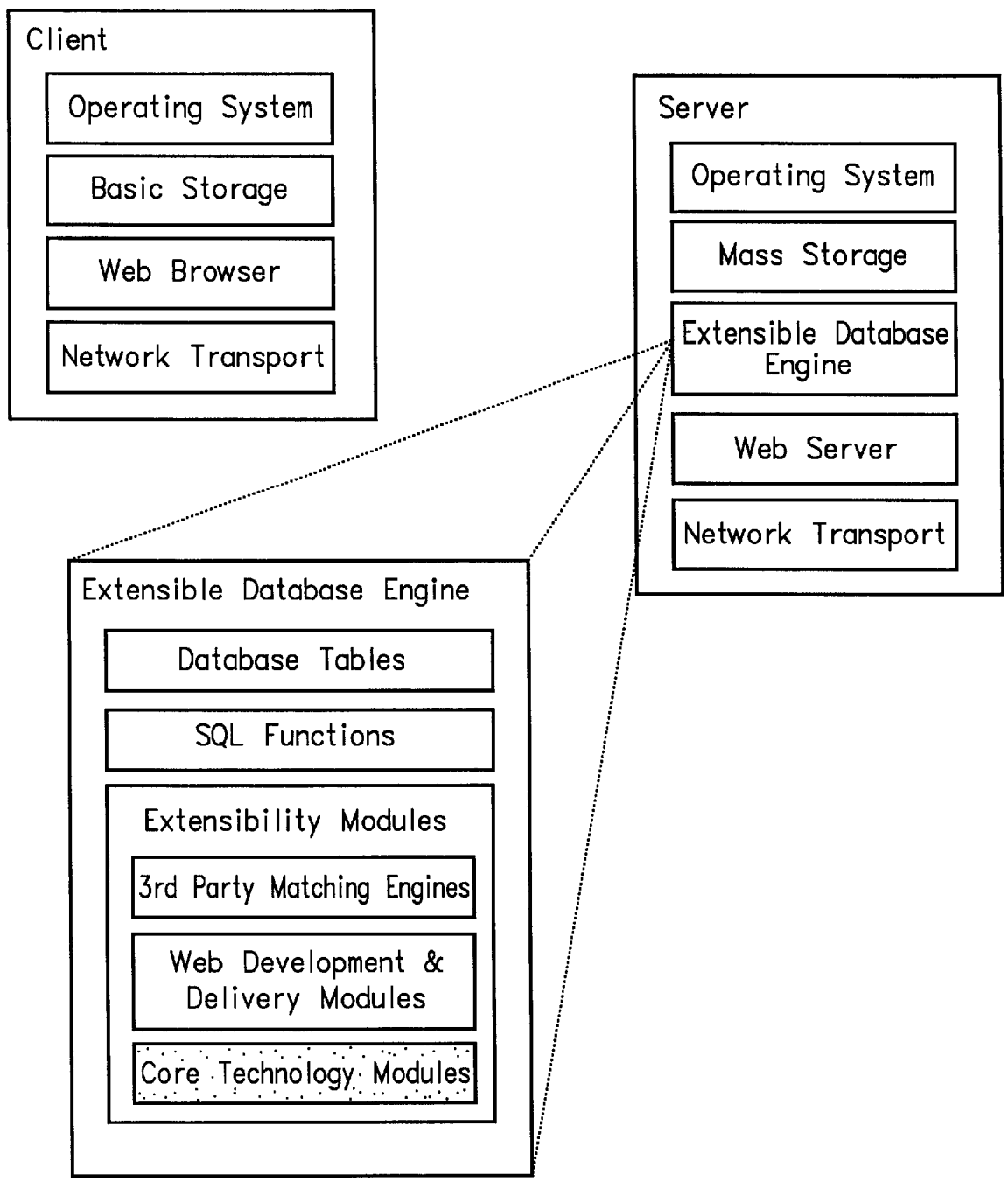
FIGS. 6 illustrates the detailed components of both the client and server according to the embodiment of the invention.

FIG. 5 illustrates a web-based clients communicating over the internet to an information server according to an embodiment of the invention. The matching system according to the present invention has an open architecture and can be used in a number of environments, but in the International Trade market the internet is used. The matching system is housed inside a server which is on the internet, and the users may connect to the server which has the matching system via a web browser, as shown in FIG. 5. The server can be SUN Microsystems-Unix based, or Intel-Microsoft NT based. The clients can be PCs running the Microsoft Windows 95 operating system, Apple Macintosh running Apple MacOS, or Sun Microsystems Workstation running Unix. The Extensible Database Management System used for the database of the invention can be Informix or Oracle product. And the plug-in modules available for the above databases could include Verity, Excalibur or Virage, FIG. 6 illustrates the detailed components of both the client and server according to the embodiment of the invention in FIG. 5. As shown in FIG. 6, each client has an operating system, a basic storage for local information and applications, a web browser for working with the web based application and browsing pages in HTML format and a network transport for connection to the global network The server which has the multi-element confidence matching system includes an operating system, a mass storage for storing the database and common information and applications, an extensible database engine for providing database services and responding to requests from clients, a web server to provide web services and a network transport, wherein the extensible database engine is used for serving clients in relation with their queries and database service requests, and it comprises database tables, SQL functions and extensible modules. Said extensible modules comprise 3rd party matching (data matching performed by applications written by other software companies) engines, web development and delivery modules for utilizing existing standard services, and core technology modules for adding the extraordinary multi-element confidence matching system functions.

Figure 7:
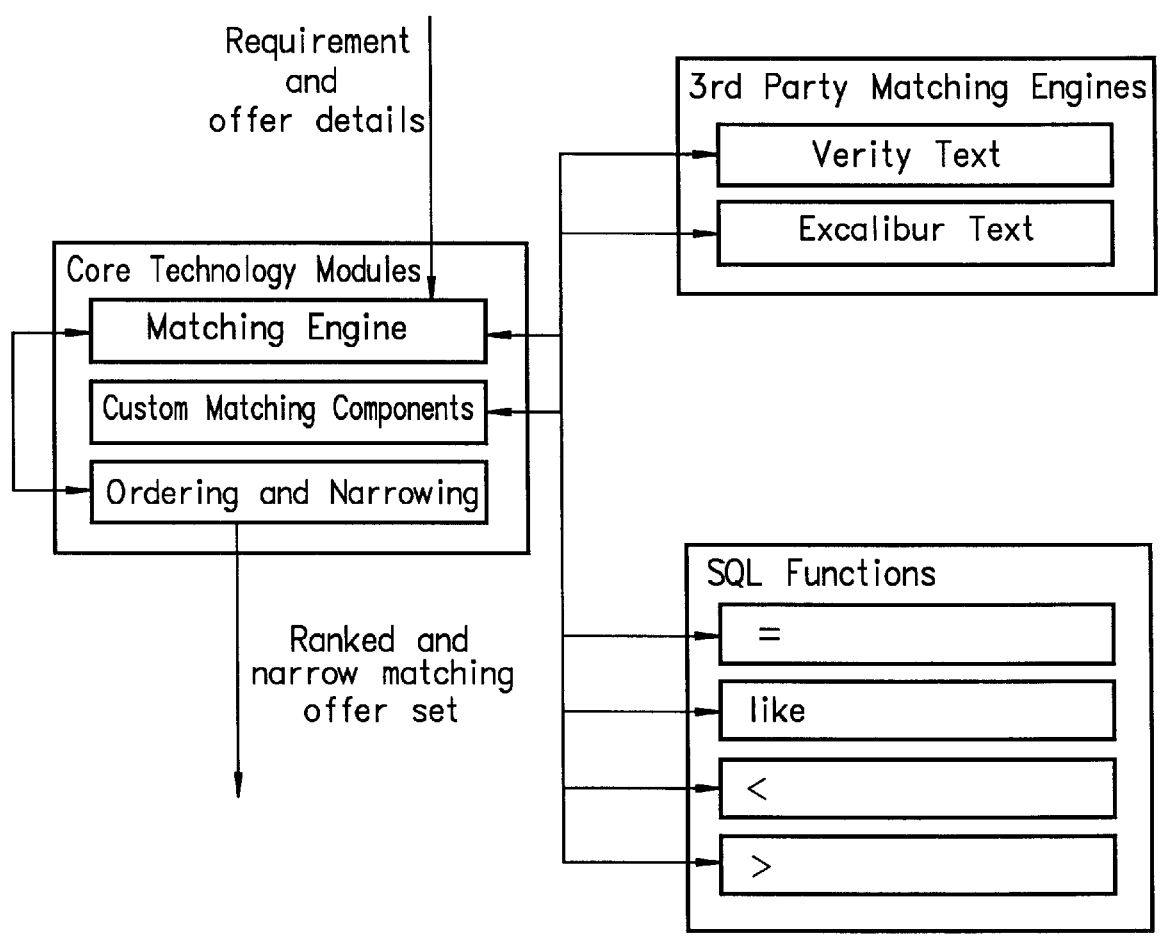
FIG. 7 illustrates the details of how the technology modules interface to the other extensible database components during the main offer selection process according to the embodiment of the invention.

FIG. 7 shows the structure of the core technology modules and its connection to the $3^{rd}$ party matching engine and SQL functions. The core technology modules include a matching engine for comparing the requirement with the offers stored in the offer database, custom matching components, and an ordering and ranking module. Here the custom matching is data matching which have been implemented in addition to built-in functions and $3^{rd}$ party technology, e.g. inclusive match-where a supply item has more quantity than the requirement As shown in FIG. 7, the requirement and the offer details are sent to the matching engine, and the matching engine and the custom matching components perform the comparison of the requirement and the offers by means of the $3^{rd}$ party matching engines, including Verity Text and Excalibur Text, and SQL functions such as equal (=), like, less than (<), and greater than (>). Thereafter, the matching results produced by the matching engine are sent to the ordering and narrowing module, in which they are ranked according to the confidence or score each matching result has, and are narrowed to reduce the amount of data returned to the user based on their own narrowing criteria, for example, only show me data with exact matches and limit it to the first 5 in price order. The results of which the matching score is less than a minimum acceptable level are discarded, thereby the ranked and narrowed matching offer set is sent back to the user The arrangement in FIG. 7 is independent of interface This diagram would remain the same whether the implementation are client-server, web-base or via a simple terminal character interface. All types of user interface can generate requirements and match them with existing offers and produce a result set.

All of the above processing would take place from within a core technology extensibility module and interface to the core database engine and any other extensibility modules installed.

Figure 8:
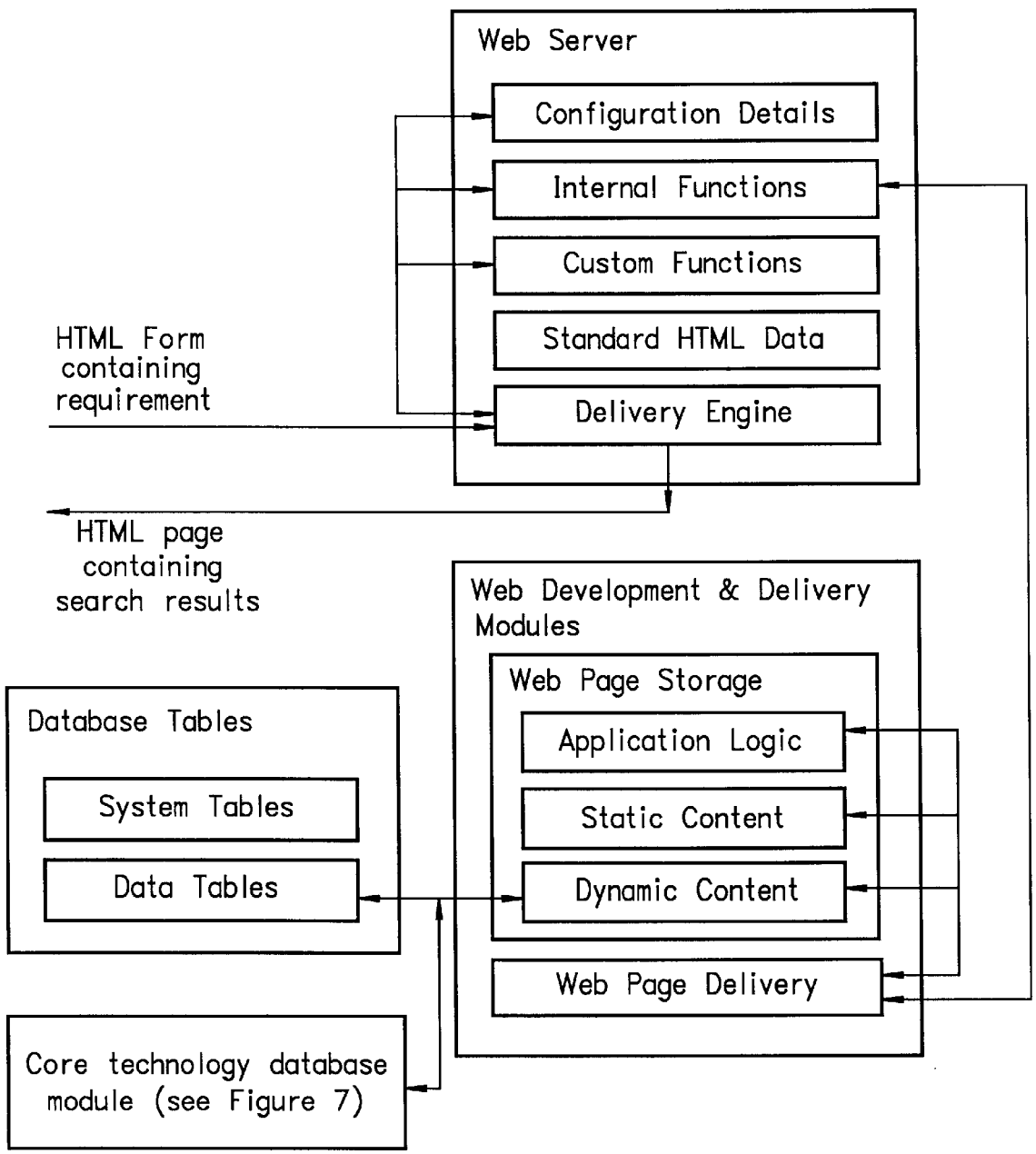
FIG. 8 illustrates a typical web implementation of the technology and the additional components required to support the implementation according to the embodiment of the invention.

FIG. 8 illustrates a typical web implementation of the multi-element confidence matching system according to the present invention and the additional components required to support it. As shown in FIG. 8, the web server shown in FIG. 6 comprises configuration details for specifying the behavior of the server, internal functions for providing basic services, custom functions for user and application specific services and standard HTML data, and a delivery engine for integrating results of search engine with standard HTML pages. The HTML form containing the requirement from the user is sent to the delivery engine. The delivery engine sends all the data of the requirement to the other modules. The web development and delivery modules include web page storage and a web page delivery. These modules handle application logic, static content of standard HTML and a dynamic content of actual data, the result of queries to the database, and variables. The web page delivery communicates with the internal functions and modules using SQL.

Figure 9A:
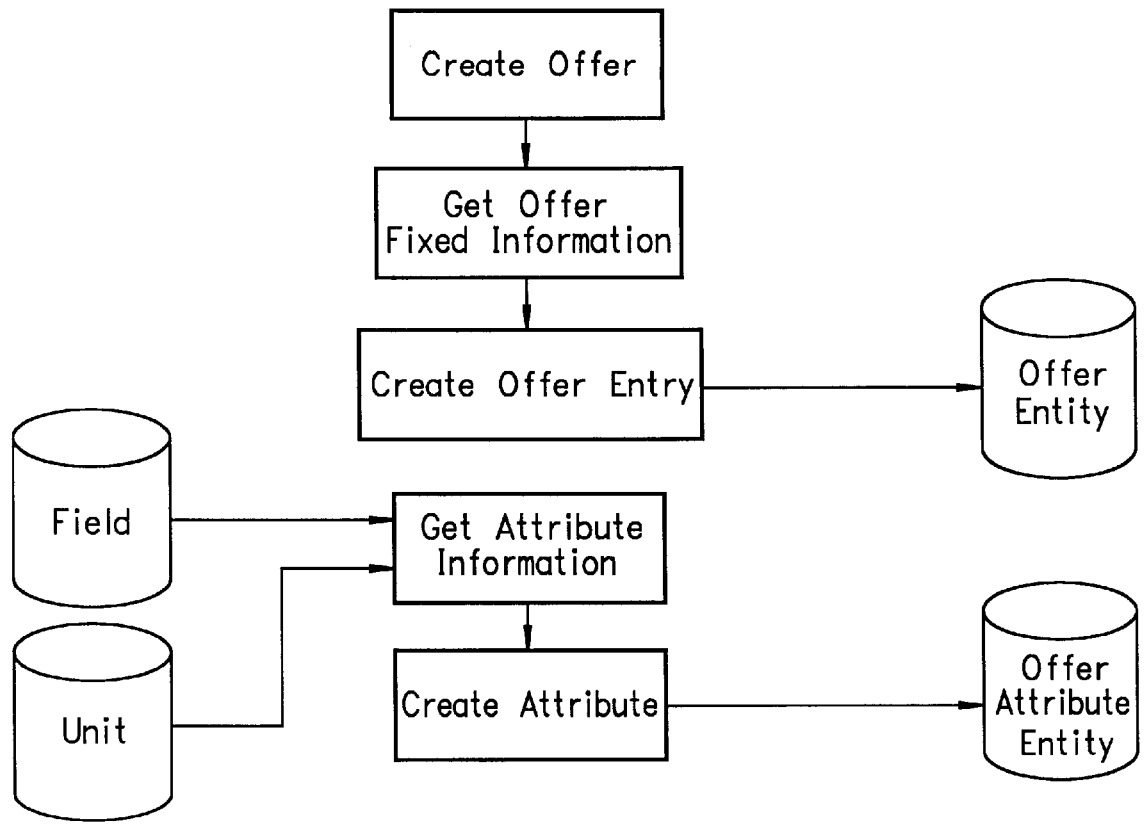
FIG. 9a, 9b, and 9c illustrate the creation of the entities in the database shown in the FIG. 4 according to an embodiment of the invention.
Figure 9B:
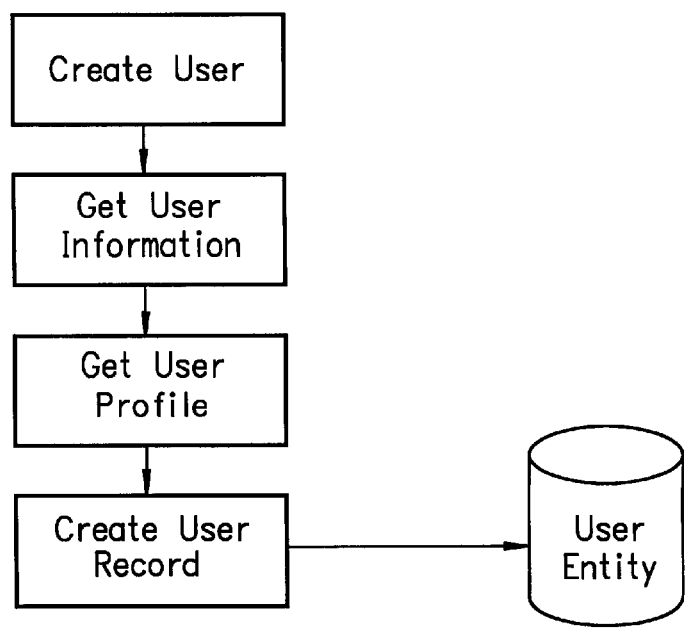
Figure 9C:
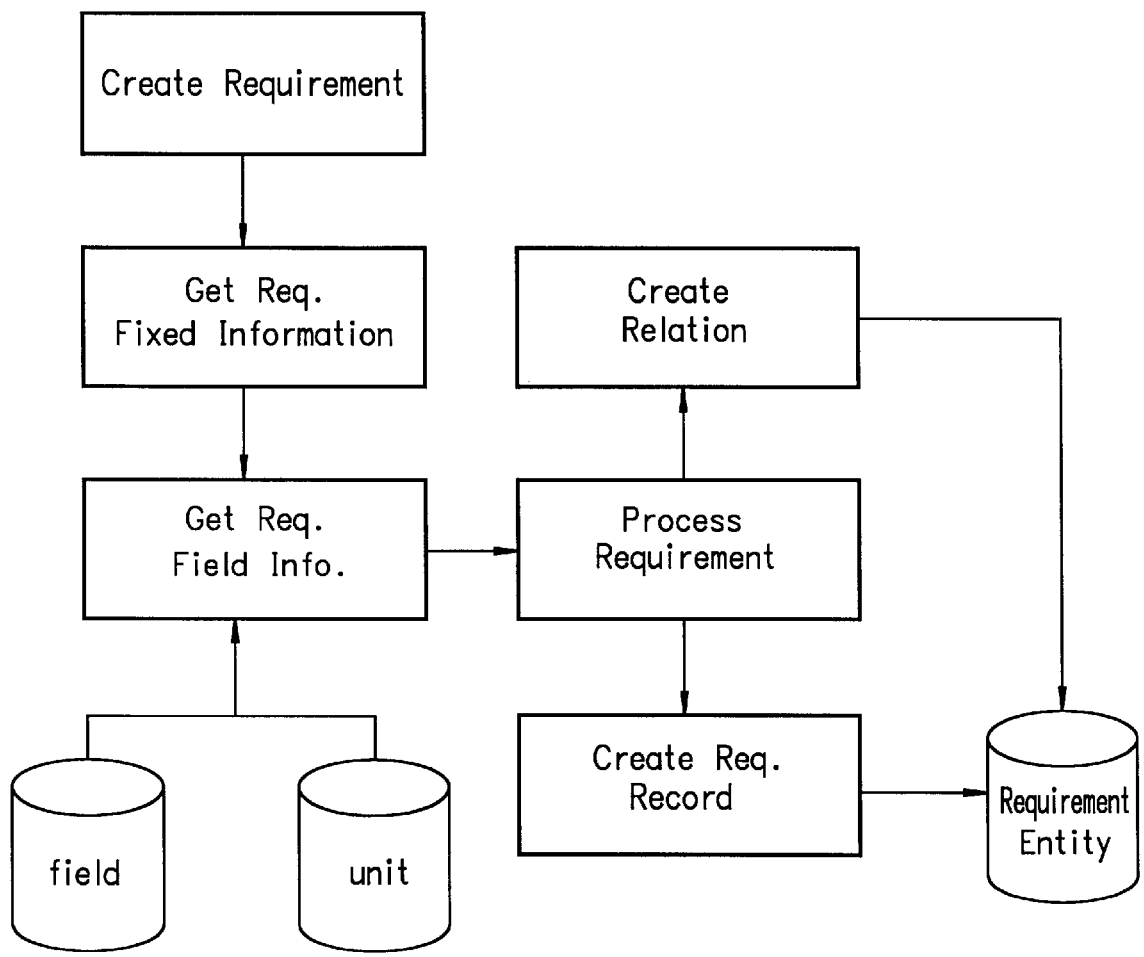

FIG. 9a, 9b, and 9c illustrate the creation of the entities in the database shown in FIG. 4 according to an embodiment of the invention. In FIG. 9a, when creating an offer entity, first, the offer fixed information is input into the system which creates an offer in the offer entity. The attribute information is also taken in from field and unit entities and this creates an attribute in the offer attribute entity.

In FIG. 9b, when creating user entity, first, the user information is input into the system, the user profile is also input, then a user record is created in the user entity. Each user keeps a user record in the user entity.

FIG. 9c illustrates the creation of the requirement entity. As shown in FIG. 9c, when creating requirement, first, the requirement fixed information is input into the system, then get the type whether it's a requirement for demand or supply. Then in turn field information will be taken using field and unit entities. At the end of this process a requirement fixed information entry and one or more attribute information entries will be created.

The detailed description to the related entities is in Tables 2–8.

Figure 10A:
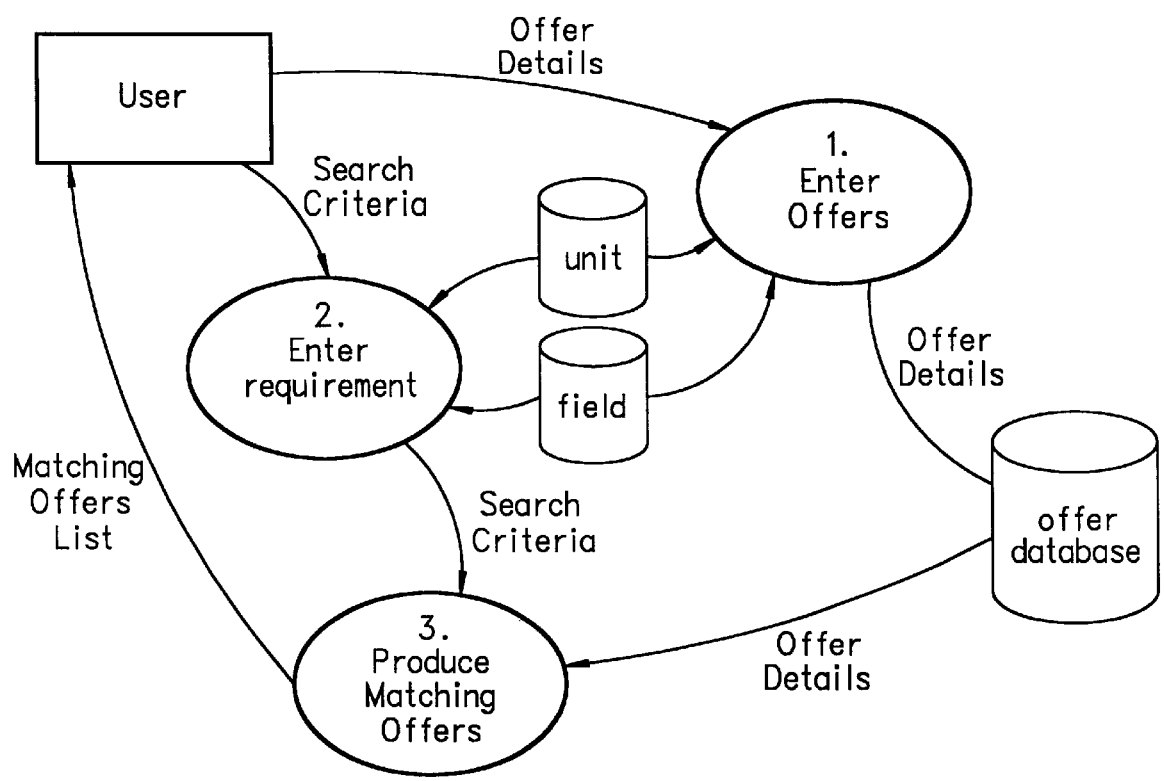
FIG. 10a and 10b shows more detail on data flow of the system according to an embodiment of the present invention of FIG. 2a and 2b.
Figure 10B:
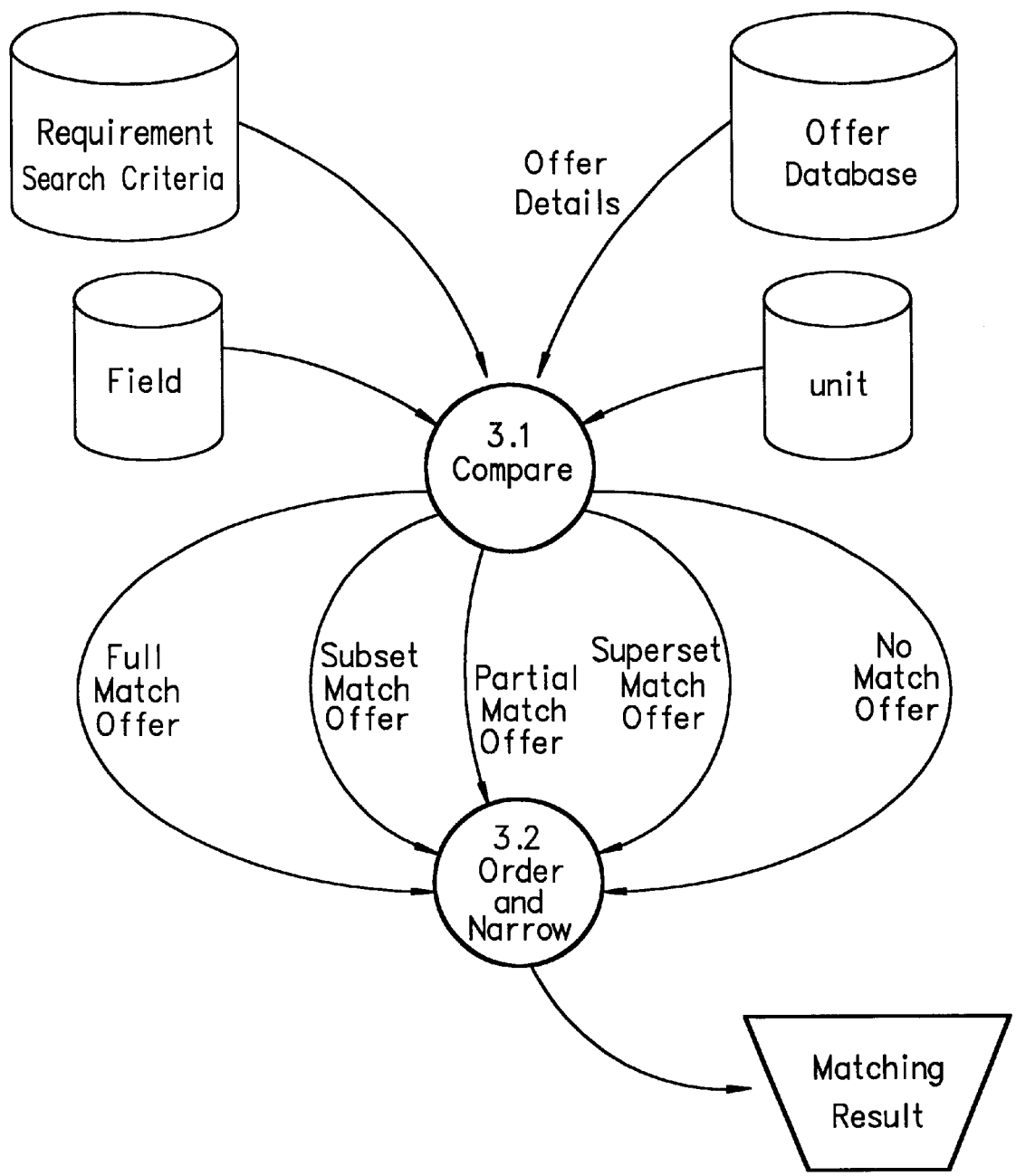

FIG. 10a and 10b shows more detail on data flow of the system according to an embodiment of the present invention of FIG. 2a and 2b, which includes a unit entity and a field entity. As described above, the field is a look-up table for name, type and length of fields that will be used in the offer and requirement entities to refer to type of specifications; and the unit is a look-up table used to show the units for figures in the offer and requirement entities. The unit entity and field entity both participate in the processes of enter offers, enter requirement in FIG. 10a and the compare process in FIG. 10b. A requirement input by a user may be also processed as an offer so that the other users may know what he needs. In the system, one user's offer is also a requirement to the other users, and his requirement is also an offer to the other users.

Figure 11:
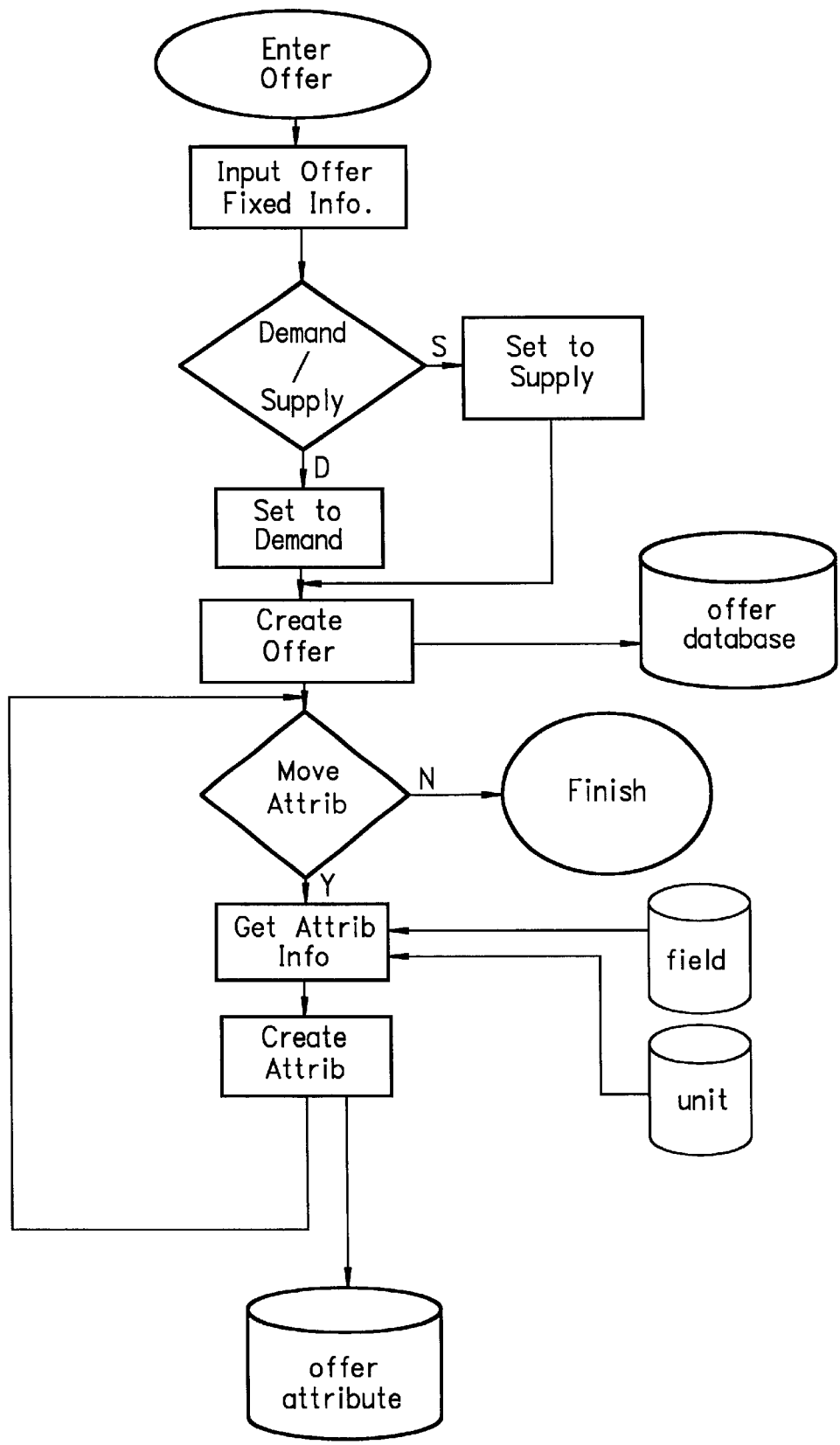
FIG. 11 illustrates the flowchart of the procedure for creating offer in the database according to an embodiment of the invention.

FIG. 11 illustrates the flowchart of the procedure for creating an offer in the database generated by executing the offer creation program as shown in FIG. 1 according to an embodiment of the invention. As shown in FIG. 10, when a user inputs his offer into the system, the input offer fixed information is extracted out and it is determined whether it is a demand or a supply according to the status of the demand_supply attribute shown in Table 4. If it is a demand, this information is set to demand; and if it is a supply, it is set to supply. At the next step, an offer is created in the offer database. Then, it is judged whether there are any more attribute, if yes, get attribute information using the field and unit, then create an attribute in the offer attribute entity in the database, and return to the judging step to determine whether there are more attributes; if no more attributes, go to finish.

Figure 12:
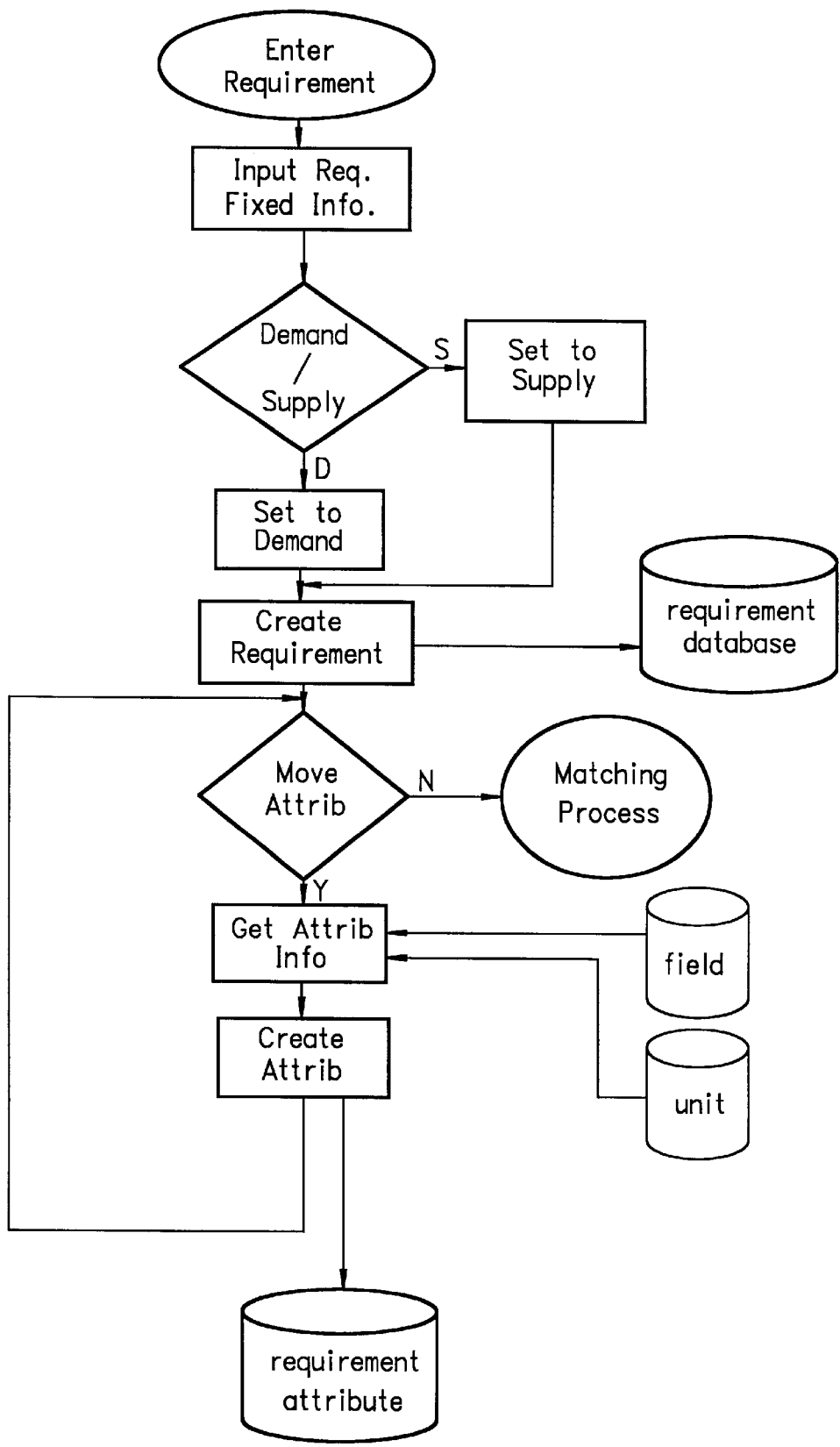
FIG. 12 illustrates the flowchart of the procedure for creating requirement in the database according to an embodiment of the invention.
Figure 13:
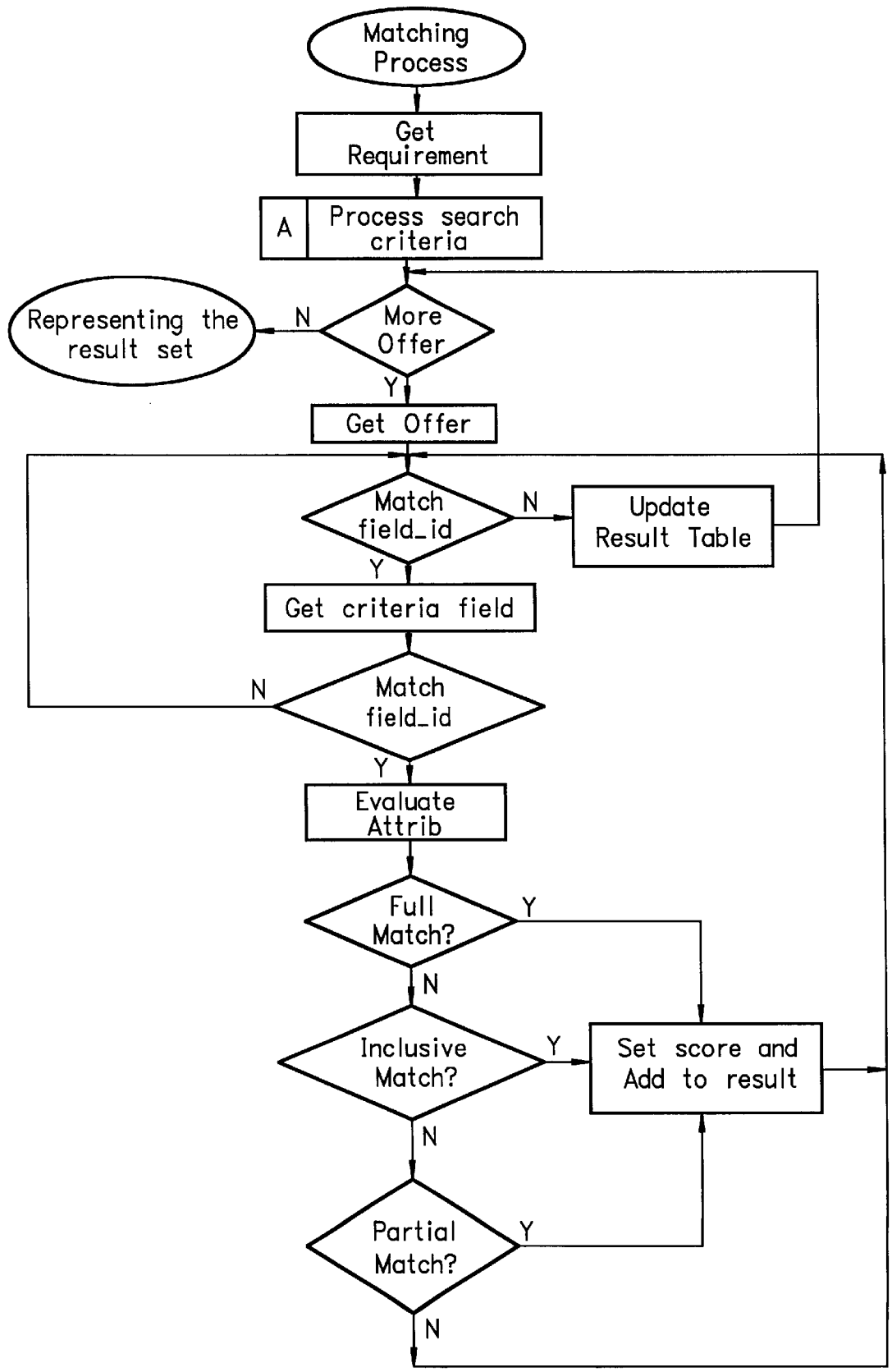
FIG. 13 illustrates the flowchart of the procedure of the search engine for matching the requirement input by the user with the offers stored in the offer entities in the database.

FIG. 12 illustrates the flowchart of the procedure for creating requirements in the database according to an embodiment of the invention. As shown in FIG. 12, when a user enters his requirement, first, the input requirement fixed information is extracted, and is determined whether it is a demand or a supply, if it is a demand, this information is set to demand; and if it is a supply, set to supply. At the next step, a requirement is created to the requirement database. At the next step, it is judged whether there are any more attribute, if yes, get attribute information using the field and unit, then create attribute to the requirement attribute entity in the database, and return to the judging step; if no more attributes, go to the matching process for matching the requirement with the offers having been stored in the database by the other users FIG. 13 illustrates the flowchart of the procedure for matching the requirement input by the user with the offers stored in the offer entities of the database As shown in FIG. 13, in the matching process, first, the requirement information is taken from the procedure allowing user to input criteria, then this requirement is processed by the system in the procedure shown in FIG. 14. The next step is to get an offer from the database and start matching fields in the requirement with fields in the offer. In both cases before getting a new offer or requirement, the system checks whether there are any. Both offer and requirement have attributes and attributes are pieces of information with specific and unique ID. If the ID of an attribute in a requirement matches the ID in the offer, the system checks if the content of offer attribute matches the one in the requirement or not and based on that generates a score for this match, which indicates the satisfaction level of the user to the matching result. At the end of all cycles if the score of offer reaches the MAL value it will participate in result set. The match level of the matching result from one search may be fill match, inclusive match, partial match, or no match, also shown in FIG. 3.

Figure 14:
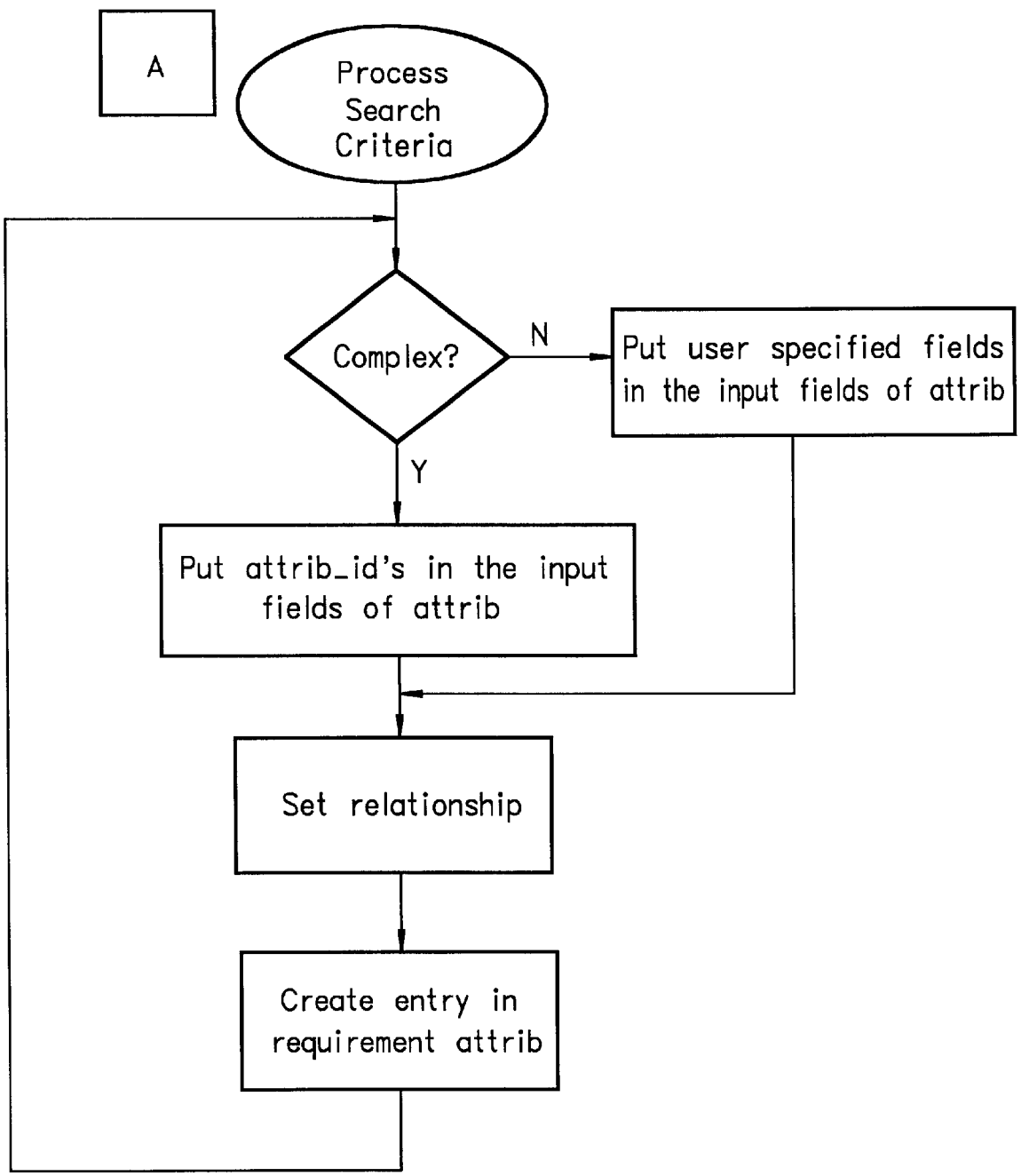
FIG. 14 illustrates the procedure A for processing search criteria in FIG. 13.

The procedure A for processing search criteria is shown in FIG. 14, in this process, it is judged if the criteria is a complex one. If yes, the attrib_ids are put in the input fields of the attribute, then set a relationship; if not put user specified fields in the input fields of attribute, then set a relationship Thereafter, create entry in the requirement attribute, and return to the complex judging step.

Using the multi-element confidence matching system of the present invention, when a user inputs an offer, the offer creation program performs the procedure in FIG. 11 for creating offer and offer attribute in the database. When a user inputs his search criteria, the search engine creates a requirement and requirement attribute in the database, then perform the matching process in FIG. 13 and 14. Specifically, after a user specifies the criteria, the system analyses it and create entries for requirement entity Every simple criteria will have an entry in the entity, the system will also create an entry for every condition which is a result of other conditions. This will be explained more in the examples below As to the result, there are two main factors that specifies the type of the result, one is the weight the user gives to every condition he specifies and the other one is the way user arranges the criteria, mostly depend on whether there is any range specified or not. The first thing the system does is to break down the criteria to single steps and create new steps based on complex criteria.

The multi-element confidence matching system and the method therefor of the present invention will be described in detail according to an embodiment of the invention, in which:

the search criteria is as follows:

| | | |
|---|---|---|
| (A= "TEXT1" | | OR |
| B= "TEXT2") | | AND |
| C> NUMBERIC1 | | AND |
| (D>DATE1 | | AND |
| D<DATE2) | | AND |
| E like "TEXT3%" | | | the evaluation is performed as the following sequences:

| | | |
|---|---|---|
| ①-A | "TEXT1" | = |
| ②-B | "TEXT2" | = |
| ③-C | NUMERIC1 | > |
| ④-D | DATE1 | > |
| ⑤-D | DATE2 | < |
| ⑥-E | "TEXT3%" | LIKE |
| ⑦-① | ② | OR |
| ⑧-④ | ⑤ | AND |
| ⑨-③ | ⑦ | AND |
| ⑩-⑨ | ⑥ | AND |
| Result-⑧ | ⑩ | AND |

The sequences and the respective operations are shown in following Table 7.

TABLE 9

| Sequence | Argument 1 | Argument 2 | Operator | Weight | Inclusive |
|---|---|---|---|---|---|
| 1 | A | TEXT1 | EQ | | |
| 2 | B | TEXT2 | EQ | | |
| 3 | C | NUMERIC1 | > | 5 | |
| 4 | D | DATE1 | > | | |
| 5 | D | DATE2 | < | | |
| 6 | E | TEXT3% | LIKE | 5 | |
| 7 | ① | ② | OR | 50 | Y |
| 8 | ④ | ⑤ | AND | 40 | Y |
| 9 | ③ | ⑦ | AND | | |
| 10 | ⑨ | ⑥ | AND | | |
| 11 | ⑧ | ⑩ | AND | | |

The result table of the evaluation or match is shown as below.

Result

The result of No Match is dependent on the possibility of Partial Match based on user criteria and weight, in other words, No Match becomes a relative one, which depends on the user's need.

If there is no True result, it will be no match, but with any True result, the overall result will be a partial match, depend on the weight that user gives to any criteria and minimum acceptable level, thereby satisfaction on the result can be measured.

In above example, (③ and (⑧ are True and ⑥ and ⑦ are False. According to the weight of each, the score for this search is as follow.

| | Weight | * | atrrib.result | = score |
|---|---|---|---|---|
| ⑦ | 50 | * | 1 | = 50 |
| ⑧ | 40 | * | 0 | = 0 |
| ③ | 5 | * | 0 | = 0 |
| ⑥ | 5 | * | 1 | = 5 |
| | | | | score 55 | if minimum acceptable score is over 55 this search result will be considered as no satisfaction, i.e., no match, but for any minimum acceptable level lower than 55 this is a partial satisfaction Of course with score of 100 the result will be FULL MATCH.

If any criteria is consisting of a range and the result is False, the result is inclusive.

From the above description, in the present invention, the concept of "no match" is relative, if the MAL is set to greater or lower value, the search results, i.e., the information user can get is different. In other words, the MAL is a modifiable value by user, and the system will assume a default value for MAL value, but user based on level of expectation can increase or decrease it. Therefore, the user may adjust the weights he assigned to the respective elements of the search criteria, to change the information scope available to him as he need.

To show how the system of the invention works, a detailed example is provided as follows.

As an example, a user specifies that he is looking for a pair of tennis shoes with a price bellow $100 and color is either "white" or "Blue", but also specifies that the color is very important by giving a weight of 80 out of 100 to the color, The system, while evaluating the criteria, accepts any white or blue tennis shoes as a partial match and those bellow $100 as a full match.

FIG. 15 shows a sample of the interface which is provided for user to specify his search criteria for this example. The user of the system, a trader, searches for a supply offer and creates a requirement with the criteria shown in FIG. 15.

The search criteria in this example is:

(color=White OR color=Blue) AND price <100, and the weight for "color=Blue" is 80, while for "price <100" is 20.

The system start dealing with this criteria in the following order:

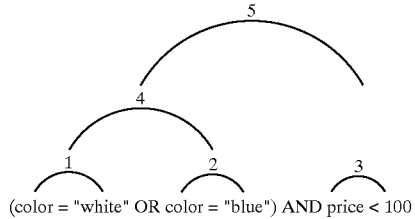

(color = "white" OR color = "blue") AND price < 100

Entities involved in this example are:

TABLE 9

| offer | |
|---|---|
| Attribute | content |
| offer_id | |
| user_id | user1 |
| demand_supply | supply |

TABLE 10

| offer_attribute | | | | | | |
|---|---|---|---|---|---|---|
| Attribute Name | Attri-bute 1 | Attri-bute 2 | Attri-bute 3 | Attri-bute 4 | Attri-bute 5 | Attri-bute 6 |
| offer_at trib_id | 1 | 2 | 3 | 4 | 5 | 6 |
| offer_id | 1 | 1 | 1 | 1 | 1 | 1 |
| field_id | 1 | 2 | 3 | 4 | 5 | 6 |
| field_u nit_id | 1 | — | 2 | 3 | 3 | — |
| field_cus-tom_name | material | color | price | length | width | size |
| field_con-tent | nylon | white | 200 | 8.5 | 12 | small |

TABLE 11

| requirement(virtual entity) | |
|---|---|
| attribute name | content |
| req_id | 1 |
| user_id | user2 |
| demand_supply | demand |

TABLE 12

| requirement_attribute | | | | | |
|---|---|---|---|---|---|
| attribute name | attri-bute 1 | attri-bute 2 | attri-bute 3 | attri-bute 4 | attri-bute 5 |
| attrib_id | 1 | 2 | 3 | 4 | 5 |
| req_id | 1 | 1 | 1 | 1 | 1 |
| attrib_seq_number | 1 | 2 | 3 | 4 | 5 |
| field_id | 2 | 2 | | 3 | |
| exact | Y | Y | | | |
| pattern | | | | | |
| before_less | | | | | |
| after_greater | | | | | |
| range | | | | | |
| unit_id | — | | | 2 | |
| input_field1 | white | blue | 1 | 100 | 3 |
| input_field2 | | | 2 | | 4 |
| weight | | | 80 | 20 | |
| inclusive | — | — | — | Y | |
| relation_type | EQ | EQ | OR | | AND |

Contents for "field_id and "field_unit_id" are from look-up tables. These tables are used when creating offer and requirement.

Contents for "field_id" and "field_unit_id" are from look-up tables. These tables are used when creating offer and requirement.

TABLE 13

| field | | | |
|---|---|---|---|
| field id | field name | field type | field length |
| 1 | material | text | 15 |
| 2 | color | text | 15 |
| 3 | price | numeric | 9.2 |
| 4 | length | numeric | 9.2 |
| 5 | Width | numeric | 9.2 |
| 6 | Size | text | 15 |

TABLE 14

| unit | |
|---|---|
| unit id | unit name |
| 1 | percent |
| 2 | German mark |
| 3 | centimeter |
| 4 | inch |
| 5 | kilogram |

System starts to evaluate attributes of requirement in order and according to their weight. The logical result of this search is NO MATCH, because the last statement (5) generates False output, but considering the weight user has given to first condition and specifying that price range can be inclusive and also the score of the search is 80 of 1009 the system consider the result as partial match, and returns this offer to the user.

| Attribute_id | Result | * | Weight | Result |
|---|---|---|---|---|
| 1 | True | | | |
| 2 | False | | | |
| 3 | True | * | 80 | = 80 |
| 4 | False | * | 20 | = 0 |
| 5 | False | | | |
| | | | | score 80 |

INDUSTRIAL APPLICABILITY

With the multi-element confidence matching system of the present invention, this system manages to know user's taste of choices by letting him specify a level of importance for each of the conditions and specifying that whether inclusive match is acceptable. This is also possible to be implemented in the system according to the embodiments of the invention that by storing requirements (criteria) it can notify user whenever a matching case enters to the system after a user has submitted the requirement. This way not only semi-artificial intelligence will be added to the system but also queries will stay active until the time of deactivation and do much more than instant queries.

When a user inputs his requirement into the system, the matching program in the matching system is executed without the intervention of the user, and the matching results are returned to the user instantly. This system can provide custom matches, non-exact matches, and the matching results of different levels are ordered and ranked so as to be narrowed, thereby the narrowed results are returned to the user. The users of the system according to the present invention are both subject and object relative to each other. Using the multi-element confidence matching system of the present invention in the international trading field, the trader or user can conduct search more efficiently and get more useful information. The ranked and narrowed search results are returned to the user instantly, and the user can adjust his weight assignment to the respective elements in the search criteria or requirement and change the minimum acceptable level to change the information he wants to get. Apparently, the multi-element confidence matching system is a highly efficient electronic trading system, and it helps the users of this system to find useful trading information and conduct his business more effectively Furthermore, the system of the present system can be also used in the field such as library, electronic purchasing, ticket ordering etc. and increase the efficiency thereof.

Having described and illustrated the principles of the invention in the preferred embodiments thereof, it should be apparent that the invention can be modified in arrangement and detail without departing from the spirit and scope of the invention. All these modifications and variations should fall in the scope defined in the appended claims.

What is claimed is:

1. A computer trade matching system useable by a plurality of users, said system comprising:
   an offer database to store offers input to said system by at least one of said users;
   offer creation program means for creating an entity for an offer input by each user in said offer database and associating each of said offers with one of supply and demand and storing said offers in said offer database;
   requirement inputting program means for receiving as search criteria, via a user interface, a user requirement that includes multiple elements, each element being assigned a weight of importance, and for setting each said user requirement to one of supply and demand; and
   a search engine to receive requirements from said requirement inputting programs means and to compare and match said user requirement with other users' offers stored in said offer database, and to return matching results to said user, wherein each matching result has a search score indicating satisfaction level of said user;
   wherein comparing is performed by matching a demand requirement with supply offers, and by matching a supply requirement with demand offers.

2. The computer trade matching system of claim 1, wherein an input said user requirement is also processed as an offer by said offer creation program means such that said requirement is stored in said offer database.

3. The computer trade matching system of claim 2, wherein each offer and requirement includes at least one item selected from a group consisting of (a) demand, (b) supply, (c) name of goods, (d) amount of goods, and (e) price of goods.

4. The computer trade matching system of claim 2, wherein search queries in said search engine remain active after a user has submitted a requirement.

5. The computer trade matching system of claim 1, wherein said search engine further carries out ordering and ranking of said matching results according to respective search scores thereof.

6. The computer trade matching system of claim 5, wherein only matching results having search scores exceeding a predetermined satisfaction level are returned to said user.

7. The computer trade matching system of claim 1, wherein said user interface to said matching system is via the Internet.

8. The computer trade matching system of claim 1, wherein only match results having search scores exceeding a predetermined satisfaction level are returned to said user.

9. The computer trade matching system of claim 1, wherein each offer and requirement includes at least one item selected from a group consisting of (a) demand, (b) supply, (c) name of goods, (d) amount of goods, and (e) price of goods.

10. The computer trade matching system of claim 1, wherein search queries in said search engine remain active after a user has submitted a requirement.

11. A computer trade method for matching a requirement of a user with offers from other users, said method comprising the following steps:
    (a) providing an offer database to store offers input by users;
    (b) creating an entity for an offer input by each user in said offer database, associating each of said offers with one of supply and demand, and storing said offers in said offer database;
    (c) receiving a requirement input by a user via a user interface and setting each requirement to one of supply and demand, said requirement including as criteria multiple elements, each of said elements being assigned a weight of importance such that each matching result has a search score indicating satisfaction level of said user;
    (d) comparing and matching said user input requirement with other users' offers stored in said offer database, wherein said comparing and matching is carried out by matching a demand requirement with supply offers, and by matching a supply requirement with demand offers; and
    (e) returning matching results from step (d) to said user.

12. The computer trade matching method of claim 11, wherein step (d) further includes ordering and ranking said matching results according to respective search scores thereof.

13. The computer trade matching method of claim 12, wherein at method step (e) only matching results having search scores above a predetermined satisfaction level are returned to said user.

14. The computer trade matching method of claim 13, wherein said requirement is further processed as an offer in step (b) such that said requirement is stored in said offer database.

15. The computer trade matching method of claim 12, wherein said requirement is further processed as an offer in step (b) such that said requirement is stored in said offer database.

16. The computer trade matching system claim 11, wherein only matching results having search scores exceeding a predetermined satisfaction level are returned to said user.

17. The computer trade matching method of claim 11, wherein said requirement is also processed as an offer at step (b) such that said requirement is stored in said offer database.

18. The computer trade matching method of claim 17, wherein said requirement includes multiple elements as search criteria, each of set elements being assigned a weight of importance such that each matching result has a search score indicating satisfaction level of said user, and wherein method step (d) further includes ordering and ranking said matching results according to respective search scores thereof.

19. The computer trade matching system of claim 17, wherein each offer and requirement includes at least one item selected from a group consisting of (a) demand, (b) supply, (c) name of goods, (d) amount of goods, and (e) price of goods.

20. The computer trade matching method of claim 17, wherein search queries in said search engine remain active after a user has submitted a requirement.

21. The computer trade matching system of claim 11, wherein each offer and requirement includes at least one item selected from a group consisting of (a) demand, (b) supply, (c) name of goods, (d) amount of goods, and (e) price of goods.

22. The computer trade matching method of claim 11, wherein search queries in said search engine remain active after a user has submitted a requirement.

* * * * *